United States Patent
Li et al.

(10) Patent No.: US 10,146,358 B2
(45) Date of Patent: Dec. 4, 2018

(54) TOUCH SENSING DISPLAY

(71) Applicant: PlayNitride Inc., Tainan (TW)

(72) Inventors: Yun-Li Li, Tainan (TW); Kuan-Yung Liao, Tainan (TW); Po-Jen Su, Tainan (TW)

(73) Assignee: PlayNitride Inc., Tainan (TW)

( * ) Notice: Subject to any disclaimer, the term of this patent is extended or adjusted under 35 U.S.C. 154(b) by 32 days.

(21) Appl. No.: 15/081,793

(22) Filed: Mar. 25, 2016

(65) Prior Publication Data

US 2016/0349900 A1 Dec. 1, 2016

(30) Foreign Application Priority Data

May 29, 2015 (TW) .............................. 104117473 A

(51) Int. Cl.
*G06F 3/041* (2006.01)
*G06F 3/042* (2006.01)

(52) U.S. Cl.
CPC .......... *G06F 3/0416* (2013.01); *G06F 3/0412* (2013.01); *G06F 3/0421* (2013.01)

(58) Field of Classification Search
CPC ..... G06F 3/0416; G06F 3/0412; G06F 3/0421
See application file for complete search history.

(56) References Cited

U.S. PATENT DOCUMENTS

| 2005/0200294 A1* | 9/2005 | Naugler, Jr. ........ G06F 3/03542 315/149 |
| 2006/0086896 A1* | 4/2006 | Han ..................... G06F 3/0421 250/221 |
| 2009/0207154 A1* | 8/2009 | Chino .................. G06F 3/0416 345/175 |
| 2013/0278556 A1* | 10/2013 | Conway ............... G06F 3/0412 345/174 |

(Continued)

FOREIGN PATENT DOCUMENTS

| CN | 101576676 | 11/2009 |
| CN | 101996006 | 3/2011 |

(Continued)

OTHER PUBLICATIONS

"Office Action of Taiwan Counterpart Application", dated Oct. 19, 2016, p. 1-p. 11, in which the listed reference as cited.

(Continued)

*Primary Examiner* — Srilakshmi K Kumar
*Assistant Examiner* — Brent D Castiaux
(74) *Attorney, Agent, or Firm* — J.C. Patents

(57) ABSTRACT

A touch sensing display including a carrier, a plurality of light emitting devices arranged in an array on the carrier, a driving unit electrically connected to the light emitting devices and a processing unit electrically connected to the light emitting devices and the driving unit is provided. The driving unit is configured to control the light emitting devices, so as to make a first part of the light emitting (Continued)

devices emit a first light. A second part of the light emitting devices are configured to receive a second light which is related to an object, and the processing unit is configured to determine a location of the object touching or approaching the carrier according to the electrical changes generated by the light emitting devices, which sense the second light, of the second part.

13 Claims, 4 Drawing Sheets

(56) References Cited

U.S. PATENT DOCUMENTS

2014/0267683 A1\* 9/2014 Bibl ............... H01L 51/50 348/87

FOREIGN PATENT DOCUMENTS

| TW | 201040815 | 11/2010 |
|---|---|---|
| TW | 201103143 | 1/2011 |
| TW | 201106231 | 2/2011 |
| TW | 201133299 | 10/2011 |
| TW | 201216137 | 4/2012 |
| TW | 201234431 | 8/2012 |
| TW | 201327301 | 7/2013 |
| TW | 201445401 | 12/2014 |
| TW | 201445730 | 12/2014 |

OTHER PUBLICATIONS

"Office Action of Taiwan Counterpart Application," dated Jun. 1, 2016, p. 1-p. 11, in which the listed references were cited.

\* cited by examiner

TOUCH SENSING DISPLAY

CROSS-REFERENCE TO RELATED APPLICATION

This application claims the priority benefit of Taiwan application serial no. 104117473, filed on May 29, 2015. The entirety of the above-mentioned patent application is hereby incorporated by reference herein and made a part of this specification.

BACKGROUND OF THE INVENTION

1. Field of the Invention

The invention relates to a touch sensing device, and particularly relates to a touch sensing display.

2. Description of Related Art

Touch sensing displays have been broadly used for various commercial and industrial operation interfaces and the user's interface of consumer products. The conventional touch sensing modules, such as resistive touch sensing modules, capacitive touch sensing modules, and inductive touch sensing modules, etc., all require arranging a plurality of touch sensing units into an array in a sensing area, and determine a location of an object in the sensing area through triggering of the touch sensing units. Thus, all the conventional touch sensing displays need to dispose the touch sensing modules on a display panel, making the size of the touch sensing displays having the touch sensing modules unable to be reduced. Besides, the manufacturing complexity and cost thereof are unable to be lowered.

SUMMARY OF THE INVENTION

The invention provides a touch sensing display capable of simultaneously providing a touch sensing function and an image display function.

A touch sensing display according to an embodiment of the invention includes a carrier, a plurality of light emitting devices arranged into an array on the carrier, a driving unit electrically connected to the light emitting devices, and a processing unit electrically connected to the light emitting devices and the driving unit. The driving unit is configured to control the light emitting devices, such that a first part of the light emitting devices emit a first light. A second part of the light emitting devices are configured to sense a second light relating to an object, and the processing unit is configured to determine a location that the object touches or approaches the carrier according to an electrical change generated after the light emitting devices of the second part sense the second light.

According to an embodiment of the invention, a light intensity of the second light is greater than a light intensity of the first light.

According to an embodiment of the invention, the second light is ambient light from an external environment. The object blocks the ambient light, resulting in a dark area on the light emitting devices and thereby making the light emitting devices of the second part generate the electrical change.

According to an embodiment of the invention, the second light is from the object. The second light results in a bright area on the light emitting devices, thereby making the light emitting devices of the second part generate the electrical change.

According to an embodiment of the invention, a wavelength of the second light is less than or equal to a wavelength of the first light.

According to an embodiment of the invention, a light intensity of the second light is lower than or equal to a light intensity of the first light.

According to an embodiment of the invention, the object reflects the first light into the second light. The second light results in a bright area on the light emitting devices, thereby making the light emitting devices of the second part generate the electrical change.

According to an embodiment of the invention, the light emitting devices are micro light emitting diodes.

According to an embodiment of the invention, a ratio between the number of the light emitting devices of the first part and the number of the light emitting devices of the second part is at least 9.

According to an embodiment of the invention, the touch display sensing device further includes a transparent protection cover. The transparent protection cover is disposed on the carrier and covers the light emitting devices.

According to an embodiment of the invention, the touch sensing display further includes a plurality of scan lines, a plurality of data lines, and a plurality of transistors. The scan lines are disposed on the carrier and electrically connected to the driving unit and the light emitting devices. The data lines are disposed on the carrier, cross the scan lines, and are electrically connected to the driving unit and the light emitting devices. Each of the transistors is electrically connected to one of the scan lines, one of the data lines, and one of the light emitting devices. The driving unit selectively sends scan signals to the scan lines and sends data signals to each of the data lines, such that the light emitting devices of the first part that simultaneously receive the scan signal and the data signal generate the first light, and the light emitting devices of the second part generate the electrical change in the related at least one data line after sensing the second light.

According to an embodiment of the invention, the driving unit makes the light emitting devices selectively emit the first light.

According to an embodiment of the invention, the light emitting devices are defined as a plurality of display pixels, and each of the display pixels includes at least three light emitting devices.

According to an embodiment of the invention, at least one of the light emitting devices of the second part is disposed between two of the display pixels that only include the light emitting devices of the first part.

Based on the above, the touch sensing display according to the embodiments of the invention includes the light emitting devices. Thus, the light emitting devices are not only able to provide an image display effect, but also able to allow the processing unit to determine the location of the touch object by sensing a beam, thereby providing a touch sensing effect.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
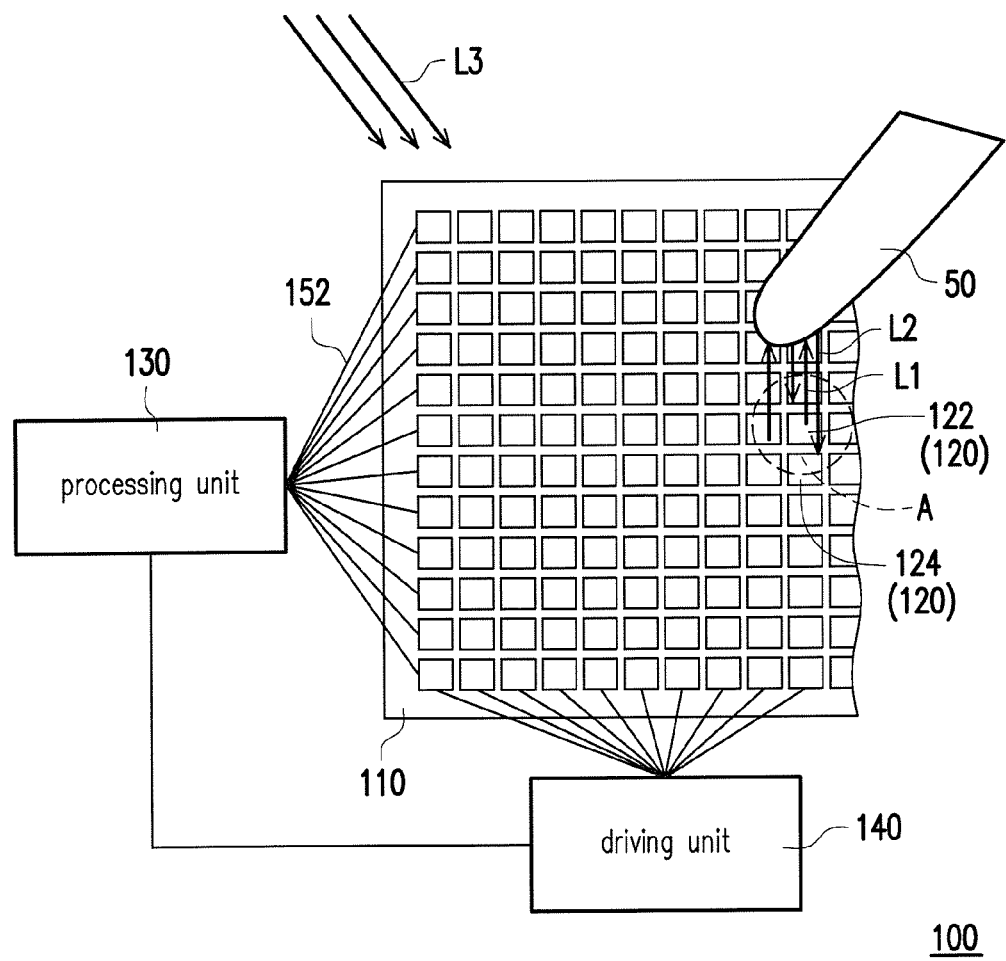
FIG. 1 is a schematic top view illustrating a touch sensing display according to a first embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

FIG. 1 is a schematic top view illustrating a touch sensing display according to a first embodiment of the invention. To clearly illustrate locations and connection relations of the components in the embodiments of the invention, the accompanying drawings for reference of the following description are already enlarged. However, the drawings do not serve to limit sizes and positions of the components of the invention. Referring to FIG. 1, a touch sensing display 100 according to the first embodiment of the invention includes a carrier 110, a plurality of light emitting devices 120 arranged into an array on the carrier 110, a driving unit 140 electrically connected to the light emitting devices 120, and a processing unit 130 electrically connected to the light emitting devices 120 and the driving unit 140. The light emitting devices 120 are configured to emit a first light L1, and the driving unit 140 selectively controls the light emitting devices 120, such that light emitting devices 122 of a first part of the light emitting devices 120 emit the first light L1. In this embodiment, the first light L1 emitted by the light emitting devices 122 of the first part may serve as a display light beam.

Another part of the light emitting devices 120 that do not emit light in this embodiment are light emitting devices 124 of a second part. The light emitting devices 124 of the second part are configured to sense a second light L2 relating to an object 50 in an external environment. In addition, the processing unit 130 is configured to determine a location that the object 50 touches or approaches the carrier 110 according to an electrical change generated after the light emitting devices 124 sense the second light L2. Namely, the driving unit 140 of this embodiment may allow the light emitting devices 122 of the first part to emit light, and the processing unit 130 detects the location that the object 50 touches or approaches the carrier 110 by determining the locations of the light emitting devices 124 of the second part that do not emit light and sense the second light L2.

More specifically, the light emitting devices 124 of the second part that do not emit light in this embodiment serve as sensing devices, for example. Since the second light L2 sensed by the light emitting devices 124 of the second part may change after the object 50 touches or approaches (by making a light intensity of the second light L2 sensed by the light emitting devices 124 of the second part increase or decrease, for example), the light emitting devices 124 of the second part that serve as the sensing devices may generate electrical changes, such as changes of electrical currents, voltages, charges, capacitances, or frequencies, etc., after sensing the change of the second light L2. The processing unit 130 then detects the location that the object 50 touches or approaches the carrier 110 according to the electrical change. Accordingly, the touch sensing display 100 of this embodiment may provide a touch sensing function and an image display function at the same time.

The light emitting devices 120 in this embodiment of the invention are light emitting diodes, for example. Preferably, the light emitting devices 120 are micro light emitting diodes (micro LEDs) whose sizes are in a range of 5 micrometers to 20 micrometers, and the micro LEDs may be intensively arranged on the carrier 110. Also, a frame formed with the light L1 may have a preferable resolution due to a characteristic that the micro LEDs may be individually driven. When the light emitting devices 124 of the second part that are intensely arranged on the carrier 110 serve as sensing devices, the processing unit 130 is able to more accurately determine the location of the object 50. Therefore, the touch sensing display 100 of this embodiment has a better resolution in terms of displaying and touch sensing functions.

The first light L1 and the second light L2 include visible light, invisible light, or a combination thereof. For example, the light emitting devices 120 of this embodiment are light emitting diodes able to emit visible light, the first light L1 emitted by the light emitting devices 122 (i.e., light emitting diodes) of the first part may serve as a display light beam, and the light emitting devices 124 (i.e., light emitting diodes) of the second part may generate the electrical change by absorbing the second light L2 that includes visible light. Besides, the first light L1 of this embodiment may include invisible light, while the light emitting devices 124 of the second part may generate the electrical change by absorbing or reducing the second light L2 that includes invisible light. The touch sensing display 100 of this embodiment may change the light emitted by the light emitting devices 120 according to an environment where the display is used, and the invention is not limited to the above description.

Moreover, the processing unit 130 is a digital signal processor (DSP), for example. However, the invention is not limited thereto. The driving unit 140 is a central processing unit (CPU) or a micro control unit (MCU), for example. However, the invention is not limited thereto. The carrier 110 is a complementary metal-oxide semiconductor (CMOS) substrate, for example, making each of the light emitting devices 120 addressing-driven by the driving unit 140. However, the invention is not limited thereto.

More specifically, in other embodiments of the invention, the touch sensing display may also serve as a light emitting diode display.

In the first embodiment of the invention, the light intensity of the second light L2 is lower than or equal to a light intensity of the first light L1, and the object 50 that touches or approaches the carrier 110 reflects the first light L1 into the second light L2, and the processing unit 130 determines the location that the object 50 touches or approaches the carrier 110 according to a location of a bright area A resulted by the second light L2 on the light emitting devices 120. Specifically, referring to FIG. 1, the second light L2 of this embodiment is the first light L1 reflected by the object 50, and the bright area A is formed with the second light L2 on the light emitting devices 120. Also, the light emitting devices 124 of the second part in the bright area A receive the second light L2 and generate the electrical change. The processing unit 130 and the driving unit 140 are respectively electrically connected with the light emitting devices 120 through a plurality of wires 152. Therefore, when one of the light emitting devices 124 of the second part that does not emit light receives the second light L2, an electrical signal transmitted and received by the wire 152 connected to the light emitting device 124 of the second part changes accordingly (e.g., a voltage difference before and after receiving), and the processing unit 130 may determine the location of the light emitting device 124 of the second part that absorbs and senses the second light L2 after receiving the electrical change, thereby determining the location of the object 50 in the external environment that touches or approaches the carrier 110. In this way, the touch sensing display 100 provides a touch sensing effect.

More specifically, the object 50 in this embodiment is a finger, for example. Also, since the light emitting devices 120 are micrometer-level micro LEDs, for example, the bright area A generated with the finger may cover a plurality of the light emitting devices 120 at the same time. For example, the bright area A may cover $10^4$ or more light emitting devices 120 together. Due to a visual retention effect of human eyes, as long as the light emitting devices 124 of the second part that serve as the sensing devices are mixed with the light emitting devices 122 of the first part that serve as display devices, the touch sensing display 100 is able to accurately determine the location of the object 50 while having the display function at the same time, so as to have a preferable touch sensing function and display function.

Preferably, a ratio between the number of the light emitting devices 122 of the first part that serve as display devices and the number of the light emitting devices 124 of the second part that serve as the sensing devices is at least 9. If the ratio is less than 9, the display effect may be less preferable. More preferably, the light emitting device 124 of the second part that serves as the sensing device may be arranged at a center of a 3×3 matrix array of the light emitting devices 120, and the light emitting devices 122 of the first part that serve as the display devices are arranged around the center of the 3×3 matrix array of the light emitting devices 120, so as to make the touch sensing function and the display function more preferable.

It should be noted that the touch sensing display 100 of this embodiment may also use the processing unit 130 to determine locations of a plurality of the touch objects 50 in the external environment that simultaneously touch or approach the carrier 110. Besides, in this embodiment, a light intensity of an ambient light L3 in the external environment may be lower than those of the first light L1 and the second light L2. In other words, the touch sensing display device 100 of this embodiment may be placed in a low-luminance environment. Since the touch sensing display 100 of this embodiment provides the first light L1 by using the light emitting devices 122 of the first part of the light emitting devices 120, and the first light L1 may be reflected into the second light L2 for sensing, the touch sensing display 100 may simultaneously provide the touch function while serving as a display light source. Namely, the touch sensing display 100 of this embodiment is able to provide a preferable touch sensing effect in a low-luminance environment.

Figure 2A:
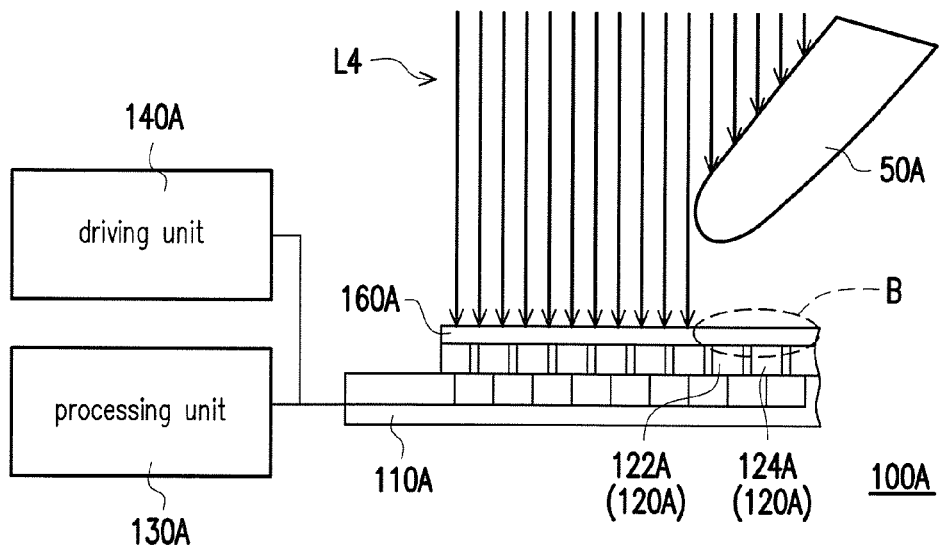
FIG. 2A is a schematic cross-sectional view illustrating a touch sensing display according to a second embodiment of the invention.

The touch sensing display according to the embodiments of the invention is not limited to the touch sensing display of the above embodiment. FIG. 2A is a schematic cross-sectional view illustrating a touch sensing display according to a second embodiment of the invention. Referring to FIG. 2A, in the second embodiment of the invention, a light intensity of a second light L4 is greater than a light intensity of a first light (not shown) emitted by light emitting devices 122A of the first part. Here, the second light L4 may be sufficient ambient light from the external environment. In other words, when a touch sensing display 100A of this embodiment is operated in a bright environment, for example, an object 50A blocks the second light L4 (i.e., the ambient light), resulting in a dark area B on the light emitting devices 120A. Light emitting devices 124A of the second part serving as the sensing devices may generate an electrical change for sensing a decrease of the second light L4. In addition, a processing unit 130A may then determine a location that the object 50A touches or approaches a carrier 110A according to the electrical change, such that the touch sensing display 100A is able to provide a preferable touch sensing effect in a high-luminance environment.

Figure 2B:
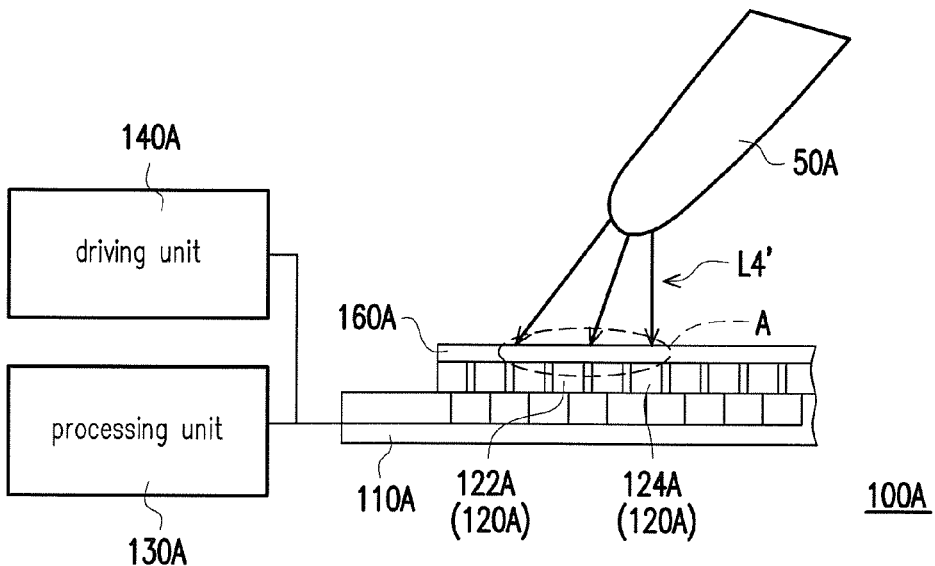
FIG. 2B is a schematic cross-sectional view illustrating a touch sensing display according to a second embodiment of the invention.

FIG. 2B is a schematic cross-sectional view illustrating a touch sensing display according to a second embodiment of the invention. It should be noted in particular that, referring to FIG. 2B, a second light L4' may be light from the object 50A, and a light intensity of the second light L4' is greater than the light intensity of the first light (not shown) emitted by the light emitting devices 122A of the first part. The second light L4' results in the bright area A on the light emitting devices 120A, and the processing unit 130A may determine the location that the object 50A touches or approaches the carrier 110A according to an electrical change generated when the light emitting devices 124A of the second part that serve as the sensing devices in the bright area A sense an increase of the second light L4'. In this way, the touch sensing display 100A is able to provide a preferable touch sensing effect in a high-luminance environment. Here, a wavelength of the second light L4' may be less than or equal to a wavelength of the first light emitted by the light emitting devices 122A of the first part, and the second light L4' thus has a higher photon energy to prevent sensing of the second light L4' from being interfered by the first light emitted by the light emitting devices 122A of the first part. Also, the second light L4' may be absorbed more easily. Therefore, the light emitting devices 124A of the second part are able to sense the second light L4' at a higher precision. However, the invention is not limited the above.

The touch sensing display 100A of this embodiment further includes a transparent protection cover 160A disposed on the carrier 110A, and the transparent protection cover 160A covers the light emitting devices 120A. To be more specific, the transparent protection cover 160A directly contact and cover the light emitting devices 120A. In addition to protecting the light emitting devices 120A, the transparent protection cover 160A may suitably fix the light emitting devices 120A on the carrier 110A. In the embodiments of the invention, the transparent protection cover 160A may be a flexible transparent protection cover, such as a polyester plastic film, or a rigid transparent cover, such as a glass block material or a sapphire block material. However, the invention is not limited thereto. Since the touch sensing display 100A of the invention may have the touch sensing function and the display function at the same time, the display of the invention has a smaller size, a lower cost, and is manufactured with a simpler manufacturing process as compared to the conventional art where a touch sensing module and a display module are separate and a protection cover thereof and the touch sensing module are integrated together in a complicated way for size reduction.

Besides, in the touch sensing display 100A of this embodiment, the location that the object 50A touches or approaches the carrier 100A is determined by sensing the second light L2 relating to the object 50A. Thus, compared with the touch sensing display in the conventional art that requires a direct contact for sensing, the touch sensing display 100A of the invention does not require the object 50A to make a direct contact to the touch sensing display 100A. The touch sensing display 100A is able to sense the location of the object 50A merely by sensing the change of the second light L2. In other words, the touch sensing display 100A according to the embodiments of the invention may offer a touch-less touch sensing function.

Figure 3:
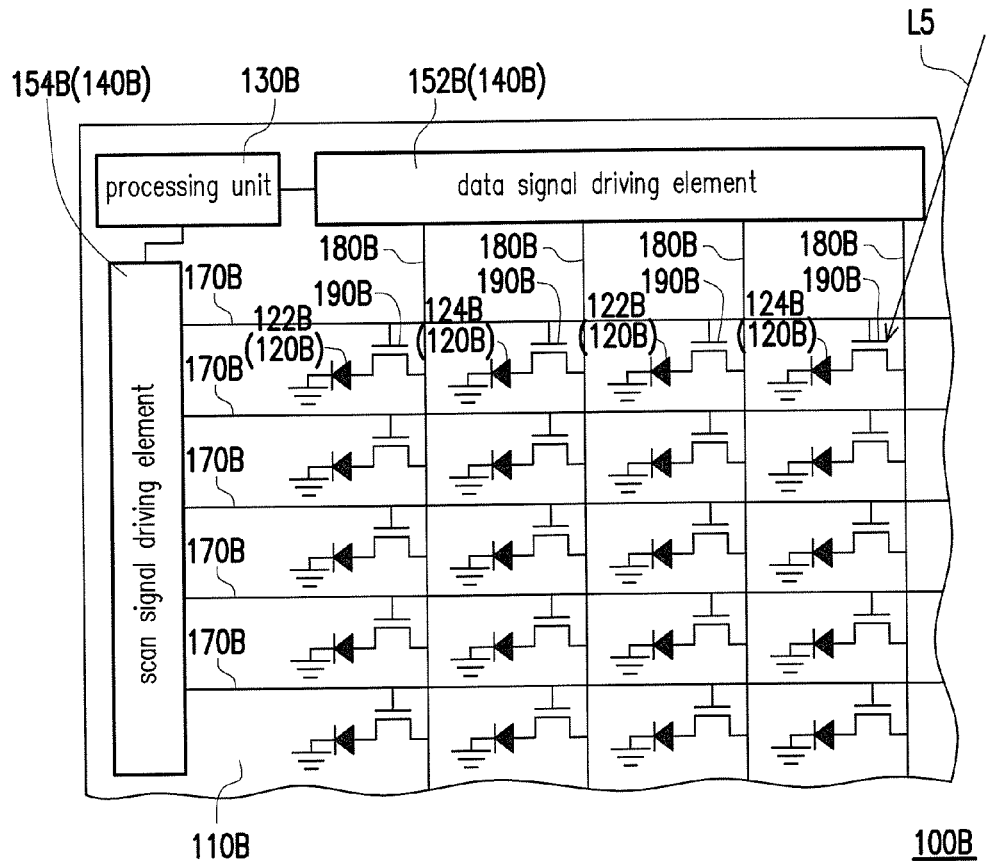
FIG. 3 is a schematic view illustrating a touch sensing display according to a third embodiment of the invention.

FIG. 3 is a schematic view illustrating a touch sensing display according to a third embodiment of the invention. Referring to FIG. 3, in the third embodiment of the invention, a touch sensing display 100B further includes a plurality of scan lines 170B, a plurality of data lines 180B crossing the scan lines 170B, and a plurality of transistors 190B. The scan lines 170B and the data lines 180B are disposed on the carrier 110B, and the scan lines 170B and the data lines 180B are electrically connected to the light emitting devices 120B and the driving unit 140B. Each of the transistors 190B is electrically connected to one of the scan lines 170B, one of the data lines 180B, and one of the light emitting devices 120B. Specifically, the driving unit 140B of this embodiment includes a data signal driving element 152B and a scan signal driving element 154B. The data lines 180B are electrically connected to the data signal driving element 152B, and the scan lines 170B are electrically connected to the scan signal driving element 154B.

Based on time points that the driving unit 140B transmits a plurality of scan signals to the scan lines 170B and electrical changes of a plurality of data signals in the data lines 180B, the processing unit 130B of this embodiment discriminates electrical changes of the light emitting devices 124B of the second part after receiving the second light L5. To be more specific, the data signal driving element 152B in the driving unit 140B of this embodiment transmits the data signals to the data lines 180B at all the time points, while the scan signal driving element 154B selectively transmits the scan signal to each of the scan lines 170B at different time points. Here, the scan signals may be alternately and selectively transmitted to each two separated scan lines 170B at different time points, or the scan signals may be selectively transmitted to specific scan lines 170B at different time points. However, the way of selecting the scan lines and data lines is not limited to the above. The transistors 190B that simultaneously receive the scan signal and the data signal are thus turned on and drive a related part of the light emitting devices 120B (i.e., the light emitting devices 122B of the first part) to emit the first light. Since another part of the light emitting devices 120B (i.e., the light emitting devices 124B of the second part) that are not driven by the scan lines 170B and the transistors 190B become the sensing devices, the electrical changes generated when the change of the second light L5 is sensed may be reflected in the data lines 180B electrically connected to the light emitting devices 124B. Thus, the processing unit 130B electrically connected to the light emitting devices 120B and the driving unit 140B is able to determine at which locations the light emitting devices 124B of the second part sense the change of the second light L5. Here, the transistor 190B is a field-effect transistor (FET), for example. However, the invention is not limited thereto.

In other words, the touch sensing display 100B of this embodiment makes use of the data signal driving element 152B and the scan signal driving element 154B of the driving unit 140B, the data lines 180B, and the scan lines 170B to drive the light emitting elements 122B of the first part, and makes use of the processing unit 130B to determine, interpret, and calculate the locations of the light emitting units 124B of the second part that are not driven but sense the changes of the second light L5 in two axial directions perpendicular to each other. Namely, the processing unit 130B of this embodiment is able to determine the locations of the light emitting devices 124B of the second part that sense the second light L5 by monitoring, recording, and calculating the electrical changes of the light emitting devices 120B in the data lines 180B and the scan lines 170B, thereby providing an effect of touch sensing.

It should be noted in particular that the driving unit 140B of this embodiment makes the light emitting devices 120B selectively emit the first light. In other words, the light emitting devices 120 are not fixedly set as the light emitting devices 122B of the first part that emit the first light or the light emitting devices 124B of the second part that sense the second light, but, for example, function to emit or sense light alternatively. Since the scan signal driving element 154B sequentially provide the scan signals to the respective scan lines 170B at different time points, the light emitting elements are sequentially and alternately driven to emit light at different time points. Due to the retention effect of human eyes, the image display effect is not influenced. Thus, the touch sensing effect is integrated, the size of the touch sensing display is reduced, and the manufacturing cost and complexity are lowered as well. To be more specific, the driving unit 140B of this embodiment may include a pulse width modulator (PWM), for example, for alternatively driving the light emitting devices 120B.

Figure 4:
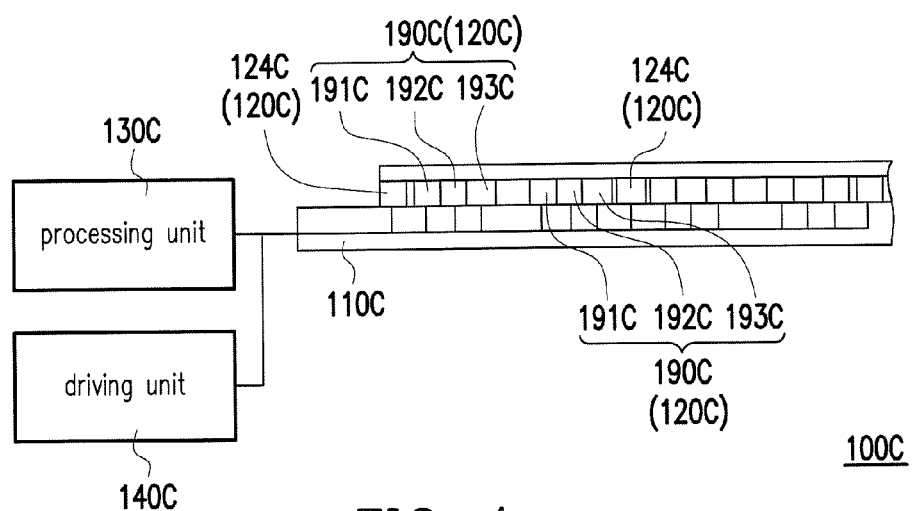
FIG. 4 is a schematic cross-sectional view illustrating a touch sensing display according to a fourth embodiment of the invention.

FIG. 4 is a schematic view illustrating a touch sensing display according to a fourth embodiment of the invention. Referring to FIG. 4, in the fourth embodiment of the invention, light emitting devices 120C of a touch sensing display 100C may be defined as a plurality of display pixels 190C arranged into an array on a carrier 110C. In this embodiment, each of the display pixels 190C electrically connected to a driving unit 140C may include at least three light emitting devices 120C, and the light emitting devices 120C may be three light emitting devices 191C, 192C, and 193C of the first part that emit light of three different colors. In addition, the light emitting devices 191C, 192C, and 193C of the first part that emit light of different colors may be used to emit a blue light beam, a red light beam, and a green light beam, thereby displaying an image as required. Then, light emitting devices 124C of the second part sense the changes of the second light (not shown), such that the processing unit 130C determines a location of an object (not shown) that touches or approaches the carrier 110C. It should be particularly noted that, in this embodiment, at least one of the light emitting devices 124C of the second part is disposed between two of the display pixels that only include the light emitting devices 191C, 192C, and 193C of the first part. However, the invention is not limited thereto.

Figure 5:
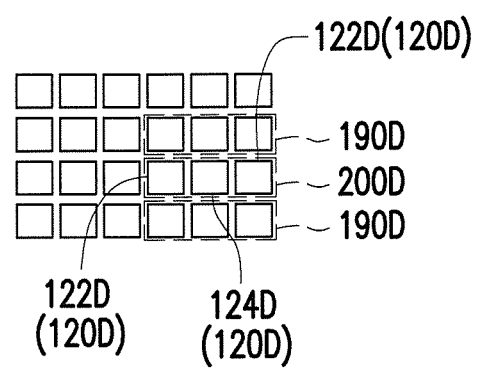
FIG. 5 is a schematic top view illustrating a part of light emitting devices of a touch sensing display according to other embodiments of the invention.

FIG. 5 is a schematic top view illustrating a part of light emitting devices of a touch sensing display according to other embodiments of the invention. In other embodiments of the invention, the driving unit may fixedly or alternately make one of light emitting devices 120D of a display pixel 200D not emit light. The light emitting device 120D that does not emit light thus becomes a light emitting device 124D of the second part for sensing, and the display pixel 200D may be disposed between two display pixels 190D having three light emitting devices 122D of the first part. The light emitting devices here are micrometer-level micro LEDs. Thus, by selectively driving to emit light, the image display effect is not influenced due to the visual retention effect of human eyes. In other embodiments of the invention, the display pixel may include four or more light emitting devices. By using one of the light emitting devices for sensing, the display may simultaneously offer a preferable display resolution and sensing precision. However, the invention is not limited thereto.

In view of the foregoing, the touch sensing display according to the embodiments of the invention includes the light emitting devices that emit the first light and sense the second light. In addition, the light emitting devices may generate electrical changes when sensing the second light, such that the processing unit may determine the location of the object with respect to the light emitting devices on the carrier based on the electrical changes, thereby providing the effects of touch sensing and display together.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A touch sensing display, comprising:
   a carrier;
   a first light emitting device and a second light emitting device, arranged into an array on the carrier, and both configured to emit and sense light selectively;
   a controller, electrically connected to the first and second light emitting devices and configured to control the first and second light emitting devices, such that the first light emitting device emits a first light; and
   a processor, electrically connected to the first and second light emitting devices and the controller, wherein the second light emitting device is configured to sense a second light relating to an object, wherein the second light is ambient light from an external environment and a light intensity of the second light is greater than a light intensity of the first light, and the object blocks the ambient light, resulting in a dark area on the first and second light emitting devices and thereby making a plurality of second light emitting devices generates an electrical change of sensing a decrease of the second light, and the processor is configured to determine a location that the object touches or approaches the carrier according to the electrical change generated from the plurality of second light emitting devices after the plurality of second light emitting devices senses the decrease of the second light.

2. The touch sensing display as claimed in claim 1, wherein the first and second light emitting devices are micro light emitting diodes.

3. The touch sensing display as claimed in claim 1, wherein a ratio between the number of the first light emitting device and the number of the second light emitting device is at least 9.

4. The touch sensing display as claimed in claim 1, further comprising a transparent protection cover, disposed on the carrier and covering the first and second light emitting devices.

5. The touch sensing display as claimed in claim 1, further comprising:
   a plurality of scan lines, disposed on the carrier and electrically connected to the controller and the first and second light emitting devices;
   a plurality of data lines, disposed on the carrier, crossing the scan lines, and electrically connected to the controller and the first and second light emitting devices; and
   a plurality of transistors, wherein each of the transistors is electrically connected to one of the scan lines, one of the data lines, and one of the first and second light emitting devices, and the controller selectively sends scan signals to the scan lines and sends data signals to the data lines, such that the first light emitting device that simultaneously receives the scan signal and the data signal generates the first light, and the second light emitting device generates the electrical change in the related at least one data line after sensing the second light.

6. The touch sensing display as claimed in claim 1, wherein the controller makes the first and second light emitting devices selectively emit the first light.

7. The touch sensing display as claimed in claim 1, wherein the first and second light emitting devices are defined as a plurality of display pixels, and each of the display pixels comprises at least three first and/or second light emitting devices.

8. The touch sensing display as claimed in claim 7, wherein at least one of the second light emitting device is disposed between two of the display pixels that only comprise the first light emitting device.

9. The touch sensing display as claimed in claim 3, wherein the second light emitting device is disposed at a center of a three-by-three matrix array of the first and second light emitting devices, and the first light emitting device is disposed around the center of the three-by-three matrix array.

10. The touch sensing display as claimed in claim 2, wherein a size of each of the first and second light emitting devices is in a range of 5 micrometers to 20 micrometers.

11. The touch sensing display as claimed in claim 2, wherein the first and second light emitting devices are configured to emit visible light.

12. A touch sensing display, comprising:
    a carrier;
    a first light emitting device and a second light emitting device, arranged into an array on the carrier, and both configured to emit and sense light selectively;
    a controller, electrically connected to the first and second light emitting devices and configured to control the first and second light emitting devices, such that the first light emitting device emits a first light; and
    a processor, electrically connected to the first and second light emitting devices and the controller, wherein the second light emitting device is configured to sense a second light relating to an object, wherein the second light is from the object and a light intensity of the second light is greater than a light intensity of the first light, and the second light results in a bright area on the first and second light emitting devices and thereby making a plurality of the second light emitting devices generates an electrical change of sensing an increase of the second light, and the processor is configured to determine a location that the object touches or approaches the carrier according to the electrical change generated from the plurality of the second light emitting devices after the plurality of the second light emitting devices senses the increase of the second light.

13. The touch sensing display as claimed in claim 12, wherein a wavelength of the second light is less than a wavelength of the first light.

\* \* \* \* \*